(12) United States Patent
Jonsson et al.

(10) Patent No.: US 7,891,095 B2
(45) Date of Patent: Feb. 22, 2011

(54) METHOD OF PRODUCING JEWELRY AND OTHER PRECIOUS METAL PRODUCTS WITH COMPLEX GEOMETRIES

(75) Inventors: Christer Jonsson, Stockholm (SE); Towe Norlén, Stockholm (SE); Lena Thorsson, Karlskoga (SE); Björn Eklund, Karlskoga (SE)

(73) Assignee: EOS GmbH Electro Optical Systems, Krailling/Munich (DE)

( * ) Notice: Subject to any disclaimer, the term of this patent is extended or adjusted under 35 U.S.C. 154(b) by 615 days.

(21) Appl. No.: 11/471,393

(22) Filed: Jun. 19, 2006

(65) Prior Publication Data

US 2007/0033805 A1 Feb. 15, 2007

Related U.S. Application Data

(63) Continuation of application No. PCT/SE2004/001326, filed on Sep. 15, 2004.

(30) Foreign Application Priority Data

Sep. 17, 2003 (SE) .................................... 0302469

(51) Int. Cl.
 A44C 5/02 (2006.01)
 A44C 25/00 (2006.01)
 A44C 27/00 (2006.01)
(52) U.S. Cl. .............. 29/896.4; 29/896.411; 29/896.42; 29/896.41; 63/4; 63/38
(58) Field of Classification Search ................ 29/896.4, 29/896.41, 896.411, 896.42, 10; 63/4, 21, 63/38
See application file for complete search history.

(56) References Cited

U.S. PATENT DOCUMENTS

| 5,347,498 A * | 9/1994 | Loth et al. .................. 368/282 |
| 6,381,942 B1 * | 5/2002 | Grosz .......................... 59/35.1 |
| 6,756,561 B2 * | 6/2004 | McGregor et al. ..... 219/121.64 |
| 7,076,972 B2 * | 7/2006 | West .............................. 63/15 |
| 7,332,537 B2 * | 2/2008 | Bredt et al. ................... 524/423 |
| 2002/0125592 A1 | 9/2002 | Schulman et al. |
| 2002/0189283 A1 * | 12/2002 | Chia et al. ........................ 63/4 |

FOREIGN PATENT DOCUMENTS

| EP | 0 542 729 A2 | 5/1993 |
| WO | WO 02/092264 A1 | 11/2002 |
| WO | WO 2005/025784 A1 | 3/2005 |

OTHER PUBLICATIONS

International Search Report for International Application No. PCT/SE 2004/001326, 4 pages, dated Dec. 21, 2004.

* cited by examiner

*Primary Examiner*—David P Bryant
*Assistant Examiner*—Alexander P Taousakis
(74) *Attorney, Agent, or Firm*—Christie, Parker & Hale, LLP

(57) ABSTRACT

The present invention relates to a novel method of producing in one and the same operation precious hallmarked precious metal products. The method is particularly suited for production of such precious metal products, i.e. jewelry and objets d'art, which have complex geometries. The basic principle of the invention is the use of the free form fabrication FFF, method known per se which involve a stepwise build-up in layers of the product from a precious-metal-containing metal powder.

7 Claims, No Drawings

METHOD OF PRODUCING JEWELRY AND OTHER PRECIOUS METAL PRODUCTS WITH COMPLEX GEOMETRIES

CROSS-REFERENCE TO RELATED APPLICATION(S)

This application is a continuation of International Application Number PCT/SE2004/001326, filed Sep. 15, 2004, which claims priority of SE 0302469-2, filed on Sep. 17, 2003, both of which are incorporated by reference herein.

The object of the present invention is to present a novel method of producing jewelry and objets d'art made of precious metal with complex geometries. The method according to the invention has inter alia proved to be particularly well suited for producing those precious metal products which consist of a large number of units which are movable relative to one another but inseparably interconnected. Commonly found products of this type are chains and link products such as necklaces and bracelets. However, the method according to the invention can advantageously also be used for producing any other type of jewelry or ornamental product made of precious metal with a more or less complex geometry.

The invention has thus made it possible to develop collections of jewelry such as necklaces, neck chains, bracelets, rings and any other jewelry type and also other types of objet d'art all with complex geometries and functions and made in a single operation. It has moreover made it possible to achieve novel surface structures on these collections, which structures have become available only with the present invention and newly developed alloys associated therewith.

Irrespective of whether they are made of precious metal or other metal, chains and link products are today manufactured by joining together a large number of individually produced components. This generally means either that each link has to be soldered or welded together separately after bending or that at least every other link has to be coupled together with the preceding link by means of a separate pin or another separately mounted part.

The present invention now presents a novel method, based on a powder-metallurgical process, of producing in a single operation jewelry and ornamental products made of precious metal and then primarily those consisting of a number of units which are interconnected, uninterrupted within themselves but freely movable relative to one another. The method according to the invention is thus particularly well suited for producing chains and link products such as necklaces and other types of link jewelry. An additional advantage of the method according to the invention is that it affords the designer great possibilities, without time-consuming handicraft effort, for rapidly producing prototypes and collections containing a large number of variations on an aesthetically attractive basic theme, for example by variation of a link shape or an external link relief. The invention also affords possibilities for producing products with novel complex geometries which would previously have been difficult or impossible to produce with the technology used until now. Hollow geometries or geometries including holes in more than one plane and/or comprising a number of (>1) individually uninterrupted parts and/or links which are coupled together with one another movably but inseparably, for example, can be considered to be complex geometries.

Within the jewelry industry, it is a basic requirement that jewelry containing precious metals is to have a sufficiently high precious metal content in order to allow it to be hallmarked according to existing law regulations. This requirement is met according to the invention by virtue of the fact that the starting material used in this connection satisfies the hallmarking conditions, which means at the same time, however, that account must be taken of the fact that there are different views in different parts of the world with regard to what is to be considered to be a sufficiently high gold content or silver content in a piece of jewelry for hallmarking. In the USA, a gold content of 14 carats is considered sufficient, for example, whereas 18 carats are required as a rule in Europe, and 22 carats are required in Asia.

The basic principle underlying the invention is the use of what are known as Freeform Fabrication (FF) methods for producing jewelry and other precious metal products with precious metal contents which allow the product to be hallmarked. With the present invention, it has thus become possible to produce in a single operation jewelry items and objets d'art with a specific design and complex geometries. The method according to the invention will certainly be of particular interest when it is a matter of producing those jewelry products which are to consist of a number of units which are movable relative to one another, such as chains and link products, where it has become possible to limit the handicraft-related part of production in favor of the more creative. The invention also affords possibilities for introducing novel shapes with many double curvature surfaces and partly open internal cavities which would previously have been difficult to produce.

All Freeform Fabrication methods, for there are a number of such methods in use today, are based on a CAD/CAM modelled construction in layers, controlled by the CAD/CAM program, of the desired product (CAD=Computer Aided Design; CAM=Computer Aided Manufacturing). FF manufacture therefore takes place by material being added gradually. This is in contrast to older manufacturing methods where material is subtracted/removed by, for example, milling or turning or material is reshaped by, for example, pressing. Although the basic principles of Freeform Fabrication are thus previously known, we are not familiar with any of these methods having been used for direct production of jewelry or other precious metal products. Nor have we been able to find any information about precious-metal-based powder material suitable for this previously having been available on the market.

According to one of the Freeform Fabrication methods known today, usually referred to as the SLS method (SLS=Selective Laser Sintering), the material build-up takes place by laser-controlled or electron-beam-controlled fusion or sintering of powder material. Each powder layer applied is sintered or fused together within itself and with the preceding powder layer by the laser beam or electron beam controlled by the CAD/CAM program, the CAD/CAM programming indicating that continuous material is required, while other parts of the powder layers are left unprocessed and can therefore be removed subsequently. The same basic principles can be used for manufacturing both metal and polymer material, but the use of polymer material is not of interest in this context.

In this variant (the SLS method) of Freeform Fabrication, use is generally made of metal powder mixtures containing at least one more high-melting and one more low-melting powder type, the more low-melting component of the mixture, the solder phase, being fused under the action of the laser controlled by the CAD/CAM program and binding other powder material where the CAD/CAM model indicates that the finished product is to consist of solid material. If in this connection parts of the other powder material, the base phase, are also fused, the residual porosity of the finished product is reduced.

In another FF method, use is made of a metal powder material which is melted completely by the product-defining laser beam, while in another variant use is made of a polymer-coated powder material, in which the polymer coating is fused by the laser in a first step in order to bind the metal particles provisionally when it solidifies, the particles then being sintered together and infiltrated to final strength in a subsequent treatment.

The basic idea underlying the present invention is now to offer a novel method of producing precious metal products of previously presented types with a sufficiently high precious metal content in order to allow them to be hallmarked in accordance with existing laws and regulations. According to the basic principles of the invention, it is to be possible for any type of FF method which provides a metal end product to be used for this intended purpose. However, we have chosen primarily to use the abovementioned SLS method with multicomponent powder, for which reason our examples illustrated below are made using this method.

For all FF methods, it is the case that the actual product-creating production process can be followed by a heat treatment or other subsequent treatment. A number of common gold-based alloys in the Au—Ag—Cu system are precipitation-hardening, for example, which means that the strength is improved considerably if the material is subjected to two known and well-defined heat treatments, first a solution heat treatment and then ageing. The surface finish of the product can be modified in an aesthetic way by, for example, etching, polishing, blasting or other surface treatment.

In the production of chains or link products or other products which in the finished state comprise components which are movable relative to one another, it is only necessary, when an FF method is used, that their edge parts which are normally adjacent to one another when the relative movements of the various components take place are positioned in the CAD/CAM model with sufficient play between one another and that in this connection an intermediate position between the end positions of the movement patterns of the parts included in the product which are movable relative to one another where there is no contact whatsoever between the parts is suitably selected.

The advantage of Freeform Fabrication is that the desired product is built up entirely without tools, which also makes it possible to build up very complicated details which can also have a number of internal cavities without interconnections. It is therefore this characteristic which is used in accordance with the present invention in order to provide chains or links which are movable relative to one another and produced in a single operation. Furthermore, a number of both internal and external double curvature surfaces can be included in the products concerned. Freeform Fabrication thus offers the designer in principle total geometrical freedom in a way which can never be achieved in the case of conventional turning, milling and casting. The advantage of Freeform Fabrication is quite simply that there are never any requirements for machining spaces or access possibilities for tools. In the jewelry context, this technique affords special advantages when it is a matter of producing in a single operation a number of individually uninterrupted parts which are coupled together movably with one another such as all types of jewelry chains and link products such as necklaces, bracelets and other objects comprising part objects which are movable relative to one another.

As far as jewelry and other objets d'art are concerned, it is as a rule not the strength of the finished product or the porosity of the material included in it which is critical. On the other hand, it is necessary for the finished products to have a precious metal content which means that they can be hallmarked. Certain requirements for the properties of the material must nevertheless be met even in the case of jewelry and other objets d'art. If, for example, the jewelry item is to include mounted stones, the basic material must thus be sufficiently ductile in order for it to be capable of being shaped around the stones and at the same time sufficiently strong in order to ensure that the stones do not leave their mountings. Compared with the engineering requirements, the material requirements are therefore considerably lower but they cannot be neglected on that account.

As already described, the starting material in Freeform Fabrication consists of a powder, and this affords good possibilities in the production of jewelry for varying the surface structure of the finished jewelry item by using powder of different compositions, different grain size and also different laser beam or electron beam parameters. Possibilities also exist for during the course of the manufacturing process changing the powder for one which gives another color, surface structure or lustre and in this way provides the finished product with another aesthetic dimension. In this connection, however, care must be taken that the replacement powder has similar metallurgical properties to that replaced.

It is quite generally the case that a finer powder gives better detail resolution but requires a longer manufacturing time, whereas a coarser powder therefore provides a finished product more rapidly but at the same time gives a different surface finish. The selection of powders of different coarseness can therefore be used to give the finished product an interesting surface structure.

The previously mentioned hallmarking requirement means that silver articles have to be capable of demonstrating a silver content of at least 800/1000 or alternatively 925/1000 in the EU, while the hallmarking requirement for gold articles, likewise in the EU, means that the finished product has to be 14 carat or alternatively 18 carat, which means that it has to contain 585/1000 or, respectively, 750/1000 parts of gold. Other hallmarking requirements may therefore apply in other countries. Correspondingly, there is a hallmarking requirement in the EU for platinum, for example, of 850/1000.

In order for it to be possible for a precious-metal-based powder material to be used in the SLS method presented previously, it must satisfy a number of basic requirements, the first of which is that the powder must contain on the one hand at least one solder phase or solder powder with a lower melting point or a higher laser absorption and on the other hand at least one base phase or base powder with a higher melting point or alternatively lower laser absorption. The principal task of the solder powder in the context is, by fusing through the action of the laser, to sinter the grains of the base powder together to form a unit. In order to be capable of performing its task in liquid phase sintering, the solder material must in the molten state wet the base powder grains. As far as the solder powder and the base powder are concerned, there is nothing to prevent these consisting individually of a number of different powder components at the same time as the precious metal content necessary for hallmarking can on the whole be concentrated mainly into one of these phases or distributed over all of them. The main task of the solder phase of binding the powder grains of the base phase together, and the main task of the base phase of guaranteeing the dimensional stability and mechanical strength of the product manufactured from them nevertheless remain.

In order for it to be possible for the powder material in question to be used in the SLS method, it must satisfy certain specific requirements. In the first place, it is thus to include a base material which constitutes the major part of the powder material used and is based on gold alloys, silver alloys or platinum alloys. At the same time, it is furthermore necessary that the powder material also includes a solder material in which all the metals considered to be precious metals can also be included together with copper and melting-point-lowering alloying materials such as zinc, boron, aluminium, gallium, indium, silicon, germanium, tin, phosphorus, antimony and bismuth. Additives which have an improving effect on the fluidity and wetting capacity of the molten alloy can also be included. As examples of such what are known as fluxes which can be integrated into the powder material, mention may be made of phosphorus, boron, silicon and in general metal elements which have a greater affinity for oxygen than copper.

By different selections of alloying materials, the final color of the finished product can be varied in a way which can provide the designer with good variation possibilities. This may mean that, when using powder material which comprises a number of different powder components, it will be attempted to make the colors of these resemble one another as closely as possible or alternatively it may be attempted to achieve great differences in color between the various powder components. The only limitations which may apply here are that the colors of the various powder components are found to be aesthetically attractive to the human eye after the manufacturing process has been completed. The same colors may mean similar compositions in solder and base materials, whereas great differences indicate the opposite.

Here, the term precious metal used so far quite generally means primarily gold, silver and platinum but also all types of alloys containing these metals and moreover the metals iridium, rhodium, ruthenium, palladium, osmium and rhenium and alloys containing these metals. It is true as already indicated above that the intention of the present invention is to propose a novel method of producing precious metal products with a sufficient precious metal content to allow the products to be hallmarked, but this does not affect what is meant in the context by a precious metal.

As has already been pointed out, when the SLS method is used, the method according to the present invention makes certain specific requirements for the powder material used in this connection. In the first place, it is thus to include a base material which constitutes the major part of the powder material used and consists of gold, silver or platinum and alloys thereof in which all other precious metals and copper and also of course usual impurities can also be included. At the same time, it is furthermore necessary that the powder material also includes a solder material in which all the metals considered to be precious metals can also be included together with copper and melting-point-lowering alloying materials such as zinc, boron, aluminium, gallium, indium, silicon, germanium, tin, phosphorus, antimony and bismuth.

Without per se being capable of being included among the precious metals, it is also possible to produce very attractive jewelry made of steel, and then perhaps primarily nickelfree stainless steel, and titanium. These two metals and alloys are very well suited for being used in the method characteristic of the invention. The reason for including steel and titanium among the precious metals is the suitability of these metals as jewelry materials because they offer the designer interesting alternatives above all if they are combined with one or more of the true precious metals.

As far as the more practical testing of the invention is concerned, it was tested using the SLS method presented above, which therefore means that the powder is applied layer by layer and requisite parts of a layer are sintered within themselves and together with the preceding layer before a new powder layer is applied. In this connection, inter alia, the gold-based alloy defined below was tested; the invention proved to function well, achieving the expected results and providing products with close tolerances and a good surface finish and a porosity, acceptable in the context, of less than 10% by volume.

Test Performed

Within the category of gold, a number of different powder mixtures were tested. The base material in these tests consisted in the main of an 18 carat gold alloy with the composition 75% Au/12.5% Ag/12.5% Cu. On the other hand, a number of different solder materials with varying composition were tested. The Au content in these was at least 50%, and in addition one or some of the alloying elements Ag, Cu, Zn, Ga, In, Si, Ge, Sn or P with a total content of a maximum of 50% was or were included. Some of these solder materials gave good results, other less good ones. For 18 carat gold articles, solder material with a composition within the range 60-80% Au, 0-15% Ag, 5-15% Cu, 5-15% Sn and 0-2% P functioned well. A solder with the composition 75% Au, 10-15% Cu, 10-15% Sn and roughly 1% P proved to be of particular interest. This solder material can be based either on only one powder with this composition or on a powder mixture consisting of, for example, 80% Au/20% Sn powder, 90% Au/10% Sn powder and 87% Cu/7% P/6% Sn powder in the proportion of 3:3:1. Certain solders containing Si and Ge also gave good results, such as, for example, a solder material with the composition 92.5% Au, 6% Ge, 1.5% Si. In our experiments, the residual porosity was less than 10% by volume, which must be considered entirely satisfactory.

Our experiments also showed that the base material should preferably constitute 60-90% of the entire powder quantity, while the solder material should lie between 40-10%. As far as the particle size of the powder material is concerned, this should not exceed 110 um and preferably not exceed 55 um. It is of course also true that the powder size used has to be adapted to the technique selected and machine type used.

After the necessary CAD/CAM preparations, necklaces made from gold and silver alloys were produced in continuous machine operations. The necklaces consisted of around sixty movably but inseparably interconnected links where the average dimension of the overall length of the links was roughly 12 mm and the links had several different individual appearances and the relative mobility between the links was at least as good as in a corresponding chain made from links joined together with one another according to the prior art.

Likely Future Development Trends

In the SLS method, use is currently made, as described above, of a metal powder mixture which, however, may in future be replaced by a base metal powder surface-coated with a more low-melting alloy. The more low-melting solder phase included in this connection as a surface coating would then be fused by the laser while the more high-melting base phase would be permitted to melt only to a certain extent, which should prove to be positive and give the final product a lower residual porosity.

Furthermore, the areas of application may develop to include more types of jewelry, preferably articles which supplement the collections of necklaces, neck chains and bracelets with, for example, rings and brooches. The capacity for utilizing the possibility of complex geometries and functions, for example locking functions, made in a single manufacturing operation is also likely to develop. Creating novel surface structures, available only by means of the technique, and novel alloys are a natural development.

In other respects, all the % contents indicated in the text relate to % by weight unless otherwise indicated.

The invention has moreover been defined in the patent claims below.

What is claimed is:

1. A method of producing in one and the same operation a jewelry or objet d'art product made of precious metal, having a complex geometry and a sufficiently high precious metal content to allow the product to be hallmarked in accordance with existing laws, the method comprising:

building up the product stepwise in layers from a precious-metal-containing powdered starting material, and wherein (a) an FFF (FreeForm Fabrication) CAD/CAM fusion process is utilized in which the powdered starting material is added in layers and, by means of control by the CAD/CAM programming of a laser beam or electron beam, a layer is caused to undergo at least partial metallurgical fusion before the next layer is added, which results in binding of each layer and each immediately preceding layer, where the product is a solid material but leaves powdered material unprocessed there between; (b) the powdered starting material has a precious metal content of 60 to 90%; (c) the product comprises a number of individually uninterrupted parts or links which are movably but inseparably coupled together with one another; and (d) the powdered material used in production during the CAD/CAM-controlled fusion process is left unprocessed within each powder layer in an area between the parts or links that are movable relative to one another, to a distance from one another that exceeds the maximum diameter of the grain size of the powdered material.

2. The method according to claim 1, wherein a second powdered material compatible with the precious-metal-containing powdered material is used to form at least one layer of the product.

3. The method according to claim 1, wherein the method is used to produce jewelry chains and/or jewelry links and/or jewelry or objets d'art with other complex geometries and/or jewelry or objets d'art irrespective of geometry or topology.

4. The method according to claim 1, wherein the finished product is subjected to subsequent heat treatment.

5. The method according to claim 1, wherein the finished product is subjected to mechanical surface treatment, such as blasting or polishing, adapted to the desired aesthetic appearance of the product.

6. The method according to claim 1, wherein the finished product is subjected to chemical surface treatment, such as etching, adapted to the desired aesthetic appearance of the product.

7. A method of producing in one and the same operation a jewelry or objet d'art product made of precious metal, having a complex geometry and a sufficiently high precious metal content to allow the product to be hallmarked in accordance with existing laws, the method comprising:

building up the product stepwise in layers from a precious-metal-containing powdered starting material, and wherein (a) an FFF (FreeForm Fabrication) CAD/CAM fusion process is utilized in which the powdered starting material is added in layers and, by means of control by the CAD/CAM programming of a laser beam or electron beam, a layer is caused to undergo at least partial metallurgical fusion before the next layer is added, which results in binding of each layer and each immediately preceding layer, where the product is a solid material but leaves powdered material unprocessed there between; (b) the powdered starting material has a precious metal content of 60 to 90% and includes at least one high-melting point powder and at least one low-melting point powder; (c) the product comprises a number of individually uninterrupted parts or links which are movably but inseparably coupled together with one another; and (d) the powdered material used in production during the CAD/CAM-controlled fusion process is left unprocessed within each powder layer in an area between the parts or links that are movable relative to one another, to a distance from one another that exceeds the maximum diameter of the grain size of the powdered material.

* * * * *